Judson R. Griffin
Cecil K. King,
INVENTORS.

United States Patent Office 3,513,687
Patented May 26, 1970

3,513,687
STRESS SIMULATING AND RECORDING
APPARATUS
Judson R. Griffin and Cecil K. King, Huntsville, Ala.,
assignors to the United States of America as represented by the Secretary of the Army
Filed July 2, 1968, Ser. No. 742,024
Int. Cl. G01b 11/18; G01n 3/30
U.S. Cl. 73—12                                      7 Claims

ABSTRACT OF THE DISCLOSURE

A laboratory method for simulating and recording the state of stress in various translucent structures under rapid acceleration loading conditions. To determine stress patterns in various structures, a cross-sectional slice is taken from the structure or a model is made and tested. A photoelastic model is subjected to impact loading, using a drop tested. A 4 x 5 studio camera and a high intensity xenon light source are used in photographing the dynamic stress applied to the model at a given instant after impact. The light is flashed by the peak of the pulse from an accelerometer mounted on the model to provide a trigger at the instant of peak stress. This static treatment provides optical quality of fringe patterns in a test sample and thereby allows evaluation of the reproducibility of the loading system and associated photographic synchronization and triggering circuits. Double exposures can be taken of separate individual tests of the same loading condition with little degradation of the optical fringe data.

DEDICATORY CLAUSE

The invention described herein may be manufactured, used, and licensed by or for the Government for governmental purposes without the payment to us of any royalty thereon.

BACKGROUND OF THE INVENTION

In the structural integrity evaluation of composite structures it is essential to obtain experimental data that will supplement and corroborate current analytical methods, structural integrity being the ability of the structure to withstand the load or forces of its designed environment. Dynamic high-speed photographic methods used in earlier impact studies are insufficient in the optical quality of fringe patterns that are obtained. Fringe patterns or areas are the dividing lines that separate the bands of stress that build up in a structure when a force or load is applied thereto. The stress bands or pattern indicate the distribution and magnitude of forces within the structure. Furthermore, even with high-speed motion picture filming of an impact test there is loss of recorded stress patterns, in a test sample, between each frame of film. One of these between-the-frames zones could well contain indications of a critical stress that go unnoticed or unrecorded. Highspeed photographing of several test drops of the sample may not cover the sample for time intervals overlooked by a preceding drop recording.

SUMMARY OF THE INVENTION

The apparatus of the present invention is an optical event recording circuit wherein a model, representing a section of a particular class of structural members, is subjected to impact loading by a commercially available drop tester. The structural model or sample may be a crosssectional slice taken from the structure or a molded model having the same shape as the slice and comprising the same structure. In drop testing the model, a strain gage accelerometer attached to the model indicates the changes in stress within the model on impact. When the desired stress is reached in the model or sample, an output from the accelerometer activates a single-shot stroboscopic light source which illuminates the sample with a single flash of light. This momentarily illuminated sample is photographically recorded. Light passing through the sample varies in wavelength in dircet proportion to the stress within the sample and is recorded in the photograph.

DESCRIPTION OF THE PREFERRED EMBODIMENT

Figure 1:
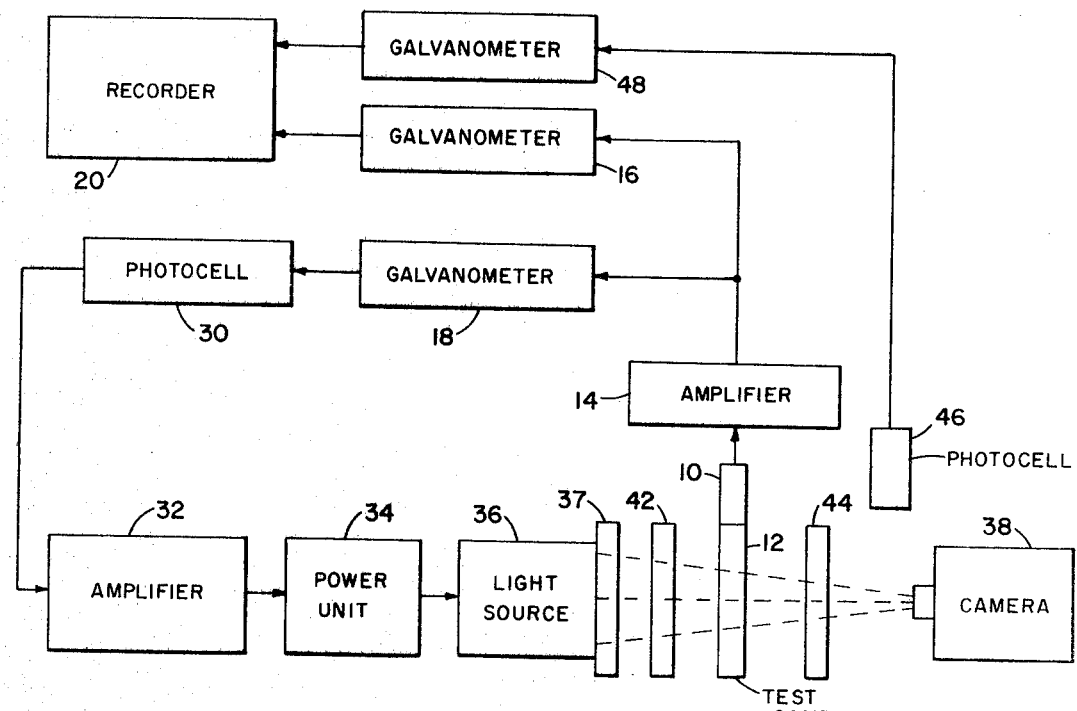
FIG. 1 is a system block diagram of one embodiment of the optical event recording circuit.

Referring now to the drawings wherein like numerals represent like parts in all figures, FIG. 1 discloses a preferred embodiment of the present invention. An accelerometer 10 is attached to a translucent, photoelastic model 12 for sensing the forces experienced by the model during an impact test. A voltage output from the accelerometer is connected to an ampliler 14, which in turn activates two individual galvanometer circuits 16 and 18. Galvanometer 16 records the loading forces experienced in model 12 by reflecting a beam of high intensity light on a photosensitive paper recorder 20. Galvanometer 18 reflects a beam of light to trigger a photocell 30 at a desired time during the impact test. An output current from photocell 30 is then applied to and activates an amplifier 32 which in turn triggers a thyratron power source 34. A light source 36 is pulsed by an output from power source 34. Light source 36 has an output light pulse duration on the order of several microseconds and is capable of illuminating the translucent model 12. A still camera 38 used in conjunction with light source 36 records the light passing through model 12 during the instant of illumination. The output light beam from source 36 is projected through a diffusing screen 37, through a polarized lens 42, through sample 12, and through another polarized lens 44, that is ninety degrees out of phase with lens 42, to impinge momentarily on the open shuttered camera 38. Light received by the camera is sensed in a photocell 46, which activates a galvanometer 48. Galvanometer 48 records a trace indicative of the timing of this flash of light in recorder 20 simultaneously with other recordings.

Camera 38, focused through polarized lens 44 on model 12, cannot see beyond model 12 since lenses 42 and 44 are ninety degrees out of phase and light waves coming through one lens will not penetrate the other lens unless changed by some medium therebetween. Similarly, the stroboscopic light flash will not be seen beyond model 12 unless changed by the medium, model 12. The plane polarized light flash strikes model 12 which causes the light to change directions, producing random light with components in the field of polarized lens 44. These random light components, indicative of the stress in model 12, pass through lens 44 are are recorded by camera 38.

Figure 2:
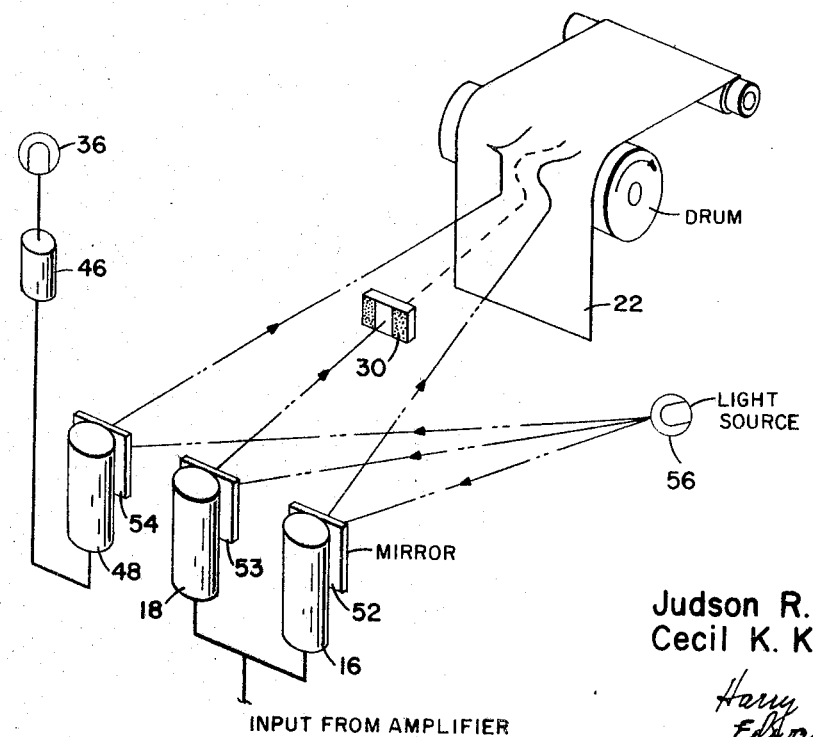
FIG. 2 is a diagrammatic view showing the stroboscopic triggering and verification circuit.

FIG. 2 discloses in increased detail the operation of galvanometers 16, 18, and 48. Galvanometers 16 and 18 receive an input electrical signal from amplifier 14 (not shown) and rotates in direct proportion to the input voltage. A mirror 52 is attached to galvanometer 16 and reflects a beam of light from a constant light source 56 to light sensitive recording paper 22 within recorder 20. In an impact test the force on test sample 12 is thus monitored by galvanometer 16, which rotates to reflect the light beam to recording paper 22 and thereby record the increasing and decreasing force applied to model 12. A mirror 53 is attached to galvanometer 18 for reflecting a light beam from source 56 to photocell 30. The resulting output voltage of photocell 30 ultimately triggers the stroboscopic light. Operation of galvanometer 48 is the same as galvanometer 16. Galvanometers 18 and 48 are located in close proximity to galvanometer 16 and photocell 30 is located in a direct line between recording paper 22 and galvanometer 18. This arrangement allows photocell 30 to be readily removed so that the light reflected by mirror 53 will make a calibration trace on recording paper 22. With photocell 30 removed, galvanometers 16 and 18 will record identical traces during a test. Galvanometer 48 rotates in response to a signal from photocell 46, which is indicative of the stroboscopic light pulse. A mirror 54 attached to galvanometer 48 reflects a beam of light from source 56 to record on photosensitive paper 22 the galvanometers response to the stroboscopic light 36 output pulse. The action of galvanometers 16 and 18 is simultaneous, followed instantly by the activation of galvanometer 48. Galvanometers 16, 18, and 48 and their associated mirrors and light source may be an integral part of the recorder 20.

Figure 3:
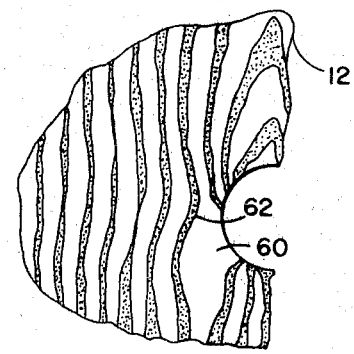
FIG. 3 is a pictorial view showing a test sample during a moment of maximum stress.

In operation, the impact tester (not shown) has an adjustable load that is dropped from a selected elevation to impact on a retaining bed. The test sample 12 is attached to the top of the load with the load in a released state and the camera 38 is focused on the sample 12. Light impinges on the opposite side of sample 12 when the lamp is triggered. As shown in FIG. 3, transient stress patterns 60 build up and diminish in a sample 12, on impact, each time a test drop occurs. These transient, isochromatic, stress patterns 60 become obvious in the polarized light plane and are photographically recorded. Each stress pattern or band 60 is separated from another stress band by fringe areas 62.

Figure 4:
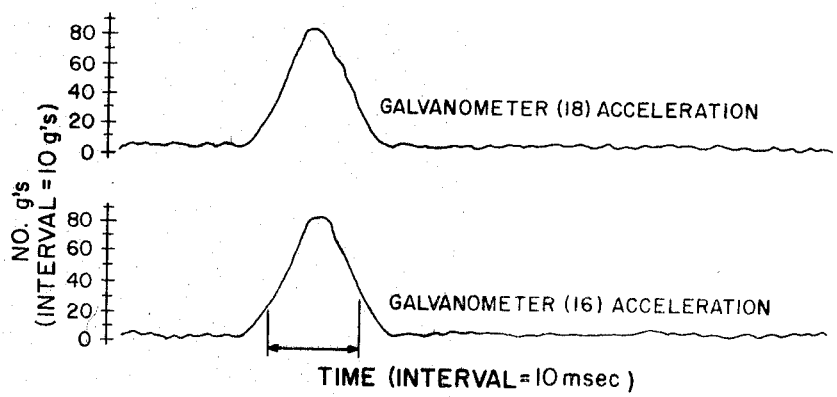
FIG. 4 is a graphic illustration of the output of two galvanometers recording a calibration drop of a test sample.

In preparing to test a sample 12, the impact tester load is dropped in several trials with the photocell 30 removed to determine the setting necessary to achieve the exact loading level desired. Since the two galvanometers 16 and 18 are effectively in parallel, with photocell 30 removed, duplicate traces are recorded on recorder 20 for each test drop. Once the desired loading level is established, the photocell 30 is positioned between recording paper 22 and galvanometer 18 to receive the amplitude of the reflected light from mirror 53 at some desired point as determined from the duplicate traces made during the trial drops. FIG. 4 shows the curves recorded during a typical trial or calibration drop.

Figure 5:
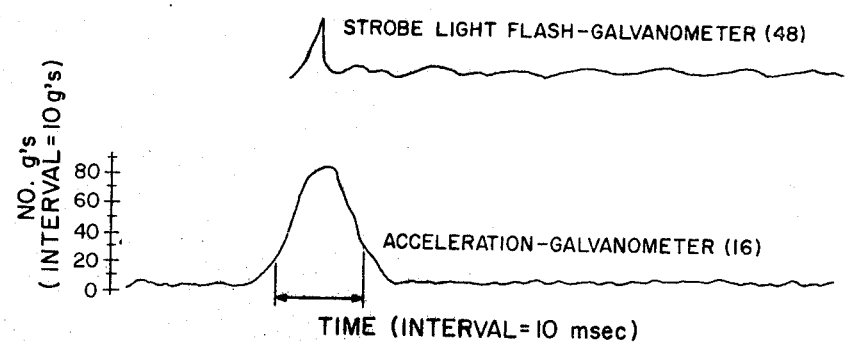
FIG. 5 is a graphic record of a test drop indicating exactly when the sample was photographed.

In an actual test, a single short duration flash from a stroboscopic light source 36 is used with camera 38 in a darkened test area to record the dynamic stress patterns 60. The instant of maximum acceleration is indicated by the peak of the curves shown in FIGS. 4 and 5. In determining a test pattern 60 for model 12 at the instant of maximum model acceleration, the triggering photocell 30 is positioned before drop so that mirror 53 on galvanometer 18 will reflect a beam of light into the photocell at the same instant that mirror 52 is reflecting the beam, representative of the maximum acceleration, onto recording paper 22. This event is also recorded simultaneously on paper 22 when photocell 46 activates galvanometer 48. FIG. 5 shows a graphic record wherein the alignment of these two traces along the time axis is visual indication of the synchronization of the photographic and recording systems.

The stress in a test model immediately following drop impact are indicative of the forces that may be felt by a full scale translucent structure when a changing force is applied thereto, such as may be encountered in a missile launching. Stress patterns, for a particular point of pressure that are taken at the peak value of acceleration which may be applied to the structure, indicate clearly whether or not the structure has sufficient strength to withstand the applied forces. Fringe lines differentiate between areas of stress thereby allowing instant recognition of the weaker areas that are more prone to rupture.

In large models where it is impossible to obtain with a single photograph the entire field of interest, a number of individual pictures can be taken, each viewing a different region of the test model in a series of similar tests. As long as the drop tester load and release point remain the same for each drop, the stress curves will follow the same pattern for each impact test. This has been verified by double exposure of film with identical equipment settings wherein the film prints were clear and distinct. This recording circuit may be used to evaluate various geometric shapes and configurations under accelerated conditions.

Obvious advantages of the instant invention include the ability to optically record the actual dynamic stresses of the loaded model. The use of a stroboscopic light and high-speed film to record the stress wave does not rely upon mechanical shuttering of the camera and thus eliminates the need for complicated and expensive high-speed photographic equipment. A large 4 x 5 studio camera can be used, which produces good image size and picture clarity. The selected impact means offers a short duration acceleration pulse which at any given time will exert a uniform load to the model.

If desired, an electrical camera shutter, such as a Kerr cell, could be used in conjunction with the accelerometer triggering circuit. This would allow a number of conventional photographic flash bulbs to be used simultaneously for illuminating the entire test model and subsequently the optical information necessary for large model evaluation would be available from a single test.

Although a particular embodiment and form of this invention has been illustrated, it is obvious to those skilled in the art that modifications may be made without departing from the scope and spirit of the foregoing disclosure. Therefore, it is understood that the invention is limited only by the claims appended hereto.

We claim:

1. Apparatus for simulating and recording stresses in a photoelastic structure including means for impact loading said structure, said apparatus comprising: an accelerometer fixedly attached to said structure for providing a signal responsive to impact thereof;

first and second polarizing means disposed on either side of said structure and having their polarizing axes aligned at right angles to each other,
 a light source disposed for energization by said accelerometer signal for passing a momentary beam of light successively through said first means, said structure and said second means when said accelerometer signal reaches a predetermined level
 and photographic means mounted to receive and record said momentary light beam, whereby a photographic image of the stress patterns in said structure will be obtained.

2. The simulating and recording apparatus as set forth in claim 1, further comprising photosensitive recording means disposed for energization by said accelerometer signal for recording the impact force experienced by said structure.

3. The apparatus as set forth in claim 2 wherein said photographic means is a camera and further comprising light responsive means mounted adjacent said camera to sense light waves impinging thereon and for recording a signal responsive thereto.

4. The apparatus as set forth in claim 3 wherein said photosensitive recording means includes first, second, and third galvanometers rotatably mounted in juxtaposition, each having an electrical input; a photosensitive paper recorder; a constant light source for projecting a continuous beam of light; first, second, and third mirrors attached to said first, second, and third galvanometers for reflecting said continuous beam of light to said recording paper; and said first and second galcanometers having the inputs thereof responsive to said accelerometer signal.

5. The apparatus as set forth in claim 4 wherein said light responsive means is a first photocell having a voltage output; said output being connected to the input of said third galvanometer.

6. The apparatus as set forth in claim 5, further comprising a second photocell adjustably mounted between said first mirror and said recording paper to intercept and be activated by said reflected light beam from said first mirror; a thyratron power unit having an input and an output; a first amplifier having an input and an output, said second photocell having a voltage output connected to the input of said first amplifier; said amplifier output being connected to the input of said power unit; and the output of said power unit being connected to the input of said light source for energization thereof.

7. The apparatus as set forth in claim 6, further comprising a second amplifier having an input and an output; and wherein said accelerometer has an output voltage connected to the input of said second amplifier, and the output of said second amplifier is connected to the inputs of said first and second galvanometers for operation thereof.

References Cited

UNITED STATES PATENTS 2,625,850   1/1953   Stanton _____ 78—88

RICHARD C. QUEISSER, Primary Examiner

J. WHALEN, Assistant Examiner

U.S. Cl. X.R.

73—88; 356—33